(12) United States Patent
Strohmaier et al.

(10) Patent No.: US 8,278,354 B2
(45) Date of Patent: Oct. 2, 2012

(54) METHOD FOR INCREASING RUMINANT FERTILITY

(75) Inventors: George K. Strohmaier, Medina, OH (US); Eiler D. Frederiksen, Henderson, NV (US); Nestor Daniel Luchini, Naperville, IL (US)

(73) Assignee: Virtus Nutrition LLC, Fairlawn, OH (US)

( * ) Notice: Subject to any disclaimer, the term of this patent is extended or adjusted under 35 U.S.C. 154(b) by 1560 days.

(21) Appl. No.: 10/915,644

(22) Filed: Aug. 10, 2004

(65) Prior Publication Data

US 2005/0009911 A1 Jan. 13, 2005

Related U.S. Application Data

(60) Continuation of application No. 10/316,486, filed on Dec. 11, 2002, now Pat. No. 6,774,252, which is a division of application No. 09/990,784, filed on Nov. 14, 2001, now Pat. No. 6,576,667.

(51) Int. Cl.
*A61K 31/202* (2006.01)
*A01N 37/00* (2006.01)

(52) U.S. Cl. .................. 514/560; 514/558; 514/156

(58) Field of Classification Search .................. None
See application file for complete search history.

(56) References Cited

U.S. PATENT DOCUMENTS

| | | |
|---|---|---|
| 4,642,317 A | 2/1987 | Palmquist et al. |
| 4,826,694 A | 5/1989 | McAskie |
| 4,853,233 A | 8/1989 | McAskie |
| 4,909,138 A | 3/1990 | McAskie |
| 5,382,678 A | 1/1995 | Vinci et al. |
| 5,391,787 A | 2/1995 | Vinci et al. |
| 5,425,963 A | 6/1995 | Lajoie |
| 5,932,257 A * | 8/1999 | Wright et al. .................. 426/2 |
| 6,229,031 B1 | 5/2001 | Strohmaier et al. |
| 6,521,249 B2 | 2/2003 | Block et al. |
| 6,576,667 B2 | 6/2003 | Strohmaier et al. |
| 6,737,078 B1 | 5/2004 | Kelley .................. 424/442 |
| 7,098,352 B2 | 8/2006 | Strohmaier et al. |
| 2002/0127259 A1 | 9/2002 | Orthoefer .................. 424/409 |

FOREIGN PATENT DOCUMENTS

| | | |
|---|---|---|
| EP | 209509 | 9/1991 |
| EP | 0678246 A1 | 10/1995 |
| GB | 2 007 076 | 5/1979 |
| IL | 125096/3 | 6/1998 |
| IL | 125097/3 | 6/1998 |
| JP | 8/275734 | 10/1996 |
| JP | 8/336360 | 12/1996 |
| JP | 10-327766 | 12/1998 |
| JP | 2001/120189 A * | 5/2008 |
| WO | WO 97/42838 | 11/1997 |
| WO | 99/66876 | 12/1999 |
| WO | 99/66977 | 12/1999 |
| WO | WO 9966877 A2 * | 12/1999 |
| WO | WO 00/21524 * | 4/2000 |
| WO | 01/62698 | 8/2001 |

OTHER PUBLICATIONS

Youdim et al., Int. J. Devl. Neuroscience, 2000, 18, 383-399.*
Comparative Embryology, http://www.pbs.org/wgbh/evolution/library/04/2/pdf/I_042_03.pdf, 3 pages, published: 2001.*
Staples et al., J. Dairy Sci., 1998, 81, 856-871.*
Elliot et al., J. Dairy Sci., 1966, 79, 1031-1039.*
Xuebing Xu et al., *Modification of Menhaden Oil by Enzymatic Acidolysis to Produce Structured Lipids: Optimization by Response Surface Design in a Packed Bed Reactor*, 77(2) JAOCS 171-76 (Feb. 2000).
*Oil and Fatty Fertilizer Handbook*, First Edition, p. 457 (ABE Yoshiro ed., Saiwai Shobo May 25, 1988).
Keiko Kume et al., *Production Test of High Quality Chicken Eggs: Creation Test of Specific DHA-Enriched Eggs*, 36 Bulletin of the Studies of Tokushima Prefectural Livestock Experiment Station, 16-20 (Mar. 1995) (English translation also provided).
Moallem et al., J. Dairy Sci., 74:510-517 (1991).
Office Action issued on Dec. 10, 2010 for U.S. Appl. No. 12/912,668.

* cited by examiner

*Primary Examiner* — David J Blanchard
*Assistant Examiner* — Kyle Purdy
(74) *Attorney, Agent, or Firm* — Fox Rothschild LLP

(57) ABSTRACT

Methods for reducing the likelihood of embryonic death in a female ruminant by feeding the ruminant for at least 30 days after conception an effective amount of free-flowing fatty acid calcium salt product comprising from about 1 to 10% by weight of eicosapentaenoic acid (EPA) and from about 1 to about 10% by weight of decosahexaenoic acid (DHA).

8 Claims, No Drawings

METHOD FOR INCREASING RUMINANT FERTILITY

CROSS REFERENCE TO RELATED APPPLICATION

This application is a continuation of U.S. patent application Ser. No. 10/316,486, filed Dec. 11, 2002, now U.S. Pat. No. 6,774,252, issued on Aug. 10, 2004, which was a division of U.S. patent application Ser. No. 09/990,784, filed Nov. 14, 2001, now U.S. Pat. No. 6,576,667 issued on Jun. 10, 2003.

BACKGROUND OF THE INVENTION

The present invention relates to a process for the production of rumen bypass feed supplements. The process converts glyceride oils to their respective fatty acid calcium salts. In particular, the present invention relates to a process for the production of calcium salts of unsaturated fatty acids derived from fish oil. The calcium salts of the present invention, when fed to cattle, provide reproductive benefits, in particular, an increase in fertility as embodied in an increased rate of impregnation. The present invention therefore also relates to methods for providing such benefits in a ruminant.

Dairy cows must be impregnated once a year to maintain a lactation cycle in which milk is produced for ten months at a time with two month rest periods in between during which the cow is dry. Given the gestation period of a dairy cow, the objective is to impregnate the cow within 83 days after calving. The efficient management of a dairy herd thus requires that the cows be maintained at the peak of fertility to ensure re-impregnation within 83 days.

Accordingly, there exists a need for nutritional supplements that promote dairy cow fertility. Fish oil fatty acids have become the focus of numerous research programs that seek to capitalize on their nutritional and physiological properties. WO 99/66877 discloses the use of omega-3 fatty acids of fish oil origin to increase fertility in animals including cattle. Among the omega-3 fatty acids disclosed are eicosapentaenoic acid (EPA) and decosahexaenoic acid (DHA).

Unsaturated fatty acids, however, undergo hydrogenation to saturated fatty acids by microbial action in the rumen and must be fed to ruminants in a protected form. The most familiar form in which fatty acids in general are protected from microbial action in the rumen are the fatty acid calcium salts disclosed by U.S. Pat. Nos. 4,642,317; 4,826,694, 4,853,233; 4,853,233 and 4,909,138. This form of fatty acid protection is widely accepted in the dairy industry.

Fish oils have a glyceride content of 100%. That is, all of the fatty acids in fish oils are in the glyceride form. Fatty acid glycerides do not readily react to form calcium salts using the processes disclosed by the above-listed patents. For a product to be commercially feasible, glyceride levels below about 5 weight percent are desirable to produce a free-flowing and stable product.

U.S. Pat. No. 5,382,678 discloses a process that reportedly can be used to prepare fatty acid calcium salts from feedstocks having glyceride contents as high as 40 weight percent, with the resulting product having a residual glyceride content of less than about 5 weight percent. Products with residual glyceride contents above 5 weight percent lack storage stability, and are susceptible to oxidation, post-heating, melting, subsequent product solidification, and a tendency to form lumps upon storage. Under industrial conditions, however, it has not been possible to consistently obtain residual glyceride levels below 5 weight percent once the initial glyceride content of the fatty acid feed stock is above about 25 weight percent when using the process of U.S. Pat. No. 5,382,678.

Hydrolyzing the glycerides to levels below 25 weight percent is not commercially feasible. Commercial omega-3 fatty acids in the free fatty acid form are so costly as to be commercially unfeasible. One can reduce the glyceride content of the fish oil starting material by blending it with a low glyceride content fatty acid feedstock, such as Palm Fatty Acid Distillate (PFAD), which has a glyceride content of about 15 to 20 weight percent.

However, the quantity of PFAD that would have to be added to fish oil to reduce the glyceride content to levels commercially feasible for use with the process of U.S. Pat. No. 5,382,678 dilutes the concentration of desirable omega-3 fatty acid such as EPA and DHA to ineffective levels. That is, the levels of DHA and EPA in the resulting calcium salt are so low that quantities of calcium salt must be added to the daily feed ration at levels above what is considered acceptable by the dairy industry.

To be commercially viable, omega-3 fatty acid calcium salt feed supplements must have DHA and EPA concentrations high enough to confer the beneficial effects of these omega-3 fatty acids when quantities of the calcium salt are added to feed ration at levels considered acceptable to the cattle industry. Therefore, a need exists for a process by which calcium salts may be prepared from fish oils having high concentrations of omega-3 fatty acid with the calcium salts produced with reduced levels of unreacted glycerides in a free-flowing and stable form easily handled by customers.

SUMMARY OF THE INVENTION

This need is met by the present invention. It has now been discovered that fatty acid calcium salts having acceptable levels of residual glycerides can be prepared from high glyceride content starting materials by using elevated levels of calcium oxide, making it possible to prepare fatty acid calcium salts from feedstocks containing levels of fish oil effective to provide useful concentrations of omega-3 fatty acids in the finished product.

Therefore, according to one aspect of the present invention, a method is provided for the preparation of fatty acid calcium salts, which includes the steps of providing a fatty acid feedstock having a glyceride content between about 30 and about 60% by weight; adding to the feedstock from about 2 to about 3 equivalents of calcium oxide relative to the feedstock, so that a reactive admixture is formed; and adding to the reactive admixture from about 2 to about 5 equivalents of water relative to the calcium oxide, so that the calcium oxide hydrates and neutralizes the fatty acids to form calcium salts.

The method of the present invention thus includes the use of feedstocks derived from fish oils diluted to glyceride contents between about 30 and about 60 weight percent with low glyceride content fatty acid feedstocks, such as PFAD. Other suitable sources of low glyceride content fatty acids include fatty acids from soy, cottonseed, corn and other vegetable fatty acid distillates, tallow, yellow grease or other animal or fish derived free fatty acid sources produced by deodorization, refining, hydrolyzation or other processes common in the fats and oil industry.

Thus, the method of the present invention obtains fatty acid calcium salts having useful concentration of omega-3 fatty acids and acceptable levels of residual glycerides that heretofore could not be obtained on a commercial scale using prior art manufacturing techniques. Therefore, according to another aspect of the present invention, fatty acid calcium salts are provided containing omega-3 fatty acids and residual glyceride levels below about 5 weight percent that are prepared by the method of the present invention. More specifically, a fatty acid calcium salt product is provided having a residual glyceride content below about 5 weight percent and containing from about 1 to about 10% by weight of EPA calcium salt and from about 1 to about 10% by weight of DHA calcium salt.

The DHA- and EPA-containing fatty acid calcium salts enhance the fertility of ruminants without using 100% glyceride content fish oil feedstocks. That is, beneficial results are obtained from feedstocks blended with fatty acids from sources other than fish oils.

Therefore, according to still yet another aspect of the present invention, a method is provided for increasing fertility in a ruminant, in which the ruminant is fed an effective amount of the EPA- and DHA-containing fatty acid calcium salts of the present invention. The method of the present invention is particularly effective to enhance the fertility of female ruminants, especially dairy cows. Methods in accordance with the present invention begin feeding the supplements daily to a female ruminant from about 21 days before to about 28 days after parturition and feeding continue at least until conception occurs. The fertility enhancement obtained by the calcium salts of the present invention also includes a reduction in embryonic death in the months following conception. Therefore, methods in accordance with the present invention continue feeding the supplements to a female ruminant for at least 30 days, and preferably for at least 60 days after conception.

The above and other features and advantages of the present invention will become clear from the following description of the preferred embodiment.

DETAILED DESCRIPTION OF THE PREFERRED EMBODIMENTS

The present invention provides a process by which high glyceride content fatty acid feedstocks may be converted to free-flowing powder or granular fatty acid calcium salt rumen bypass feed supplements, making it possible to prepare fatty acid calcium salts from fish oils, wherein the calcium salts contain useful and beneficial quantities of omega-3 fatty acids. The use of such high glyceride content fatty acid feedstocks represents a significant departure from conventional processes for the manufacture of fatty acid calcium salt feed supplements. The term "glyceride" as employed herein includes $C_{10}$-$C_{22}$ fatty acid monoglycerides, diglycerides, triglycerides, and any mixture thereof.

In a typical process according to the present invention, fatty acid feedstocks are added to a production vessel. The mixing should be accomplished in a kettle designed so that intensive and intimate contacting occurs between the calcium oxide and fat/oil admixture so that a homogeneous dispersion of the calcium oxide particles results. The types of internal mixing elements span a wide gap but would include those with propeller, turbine, plows with chopper blades, or preferably "Cowles-type" dispersing blades as examples, but others may apply. These same devices would also be suitable for dispersing and homogenizing the water fraction into the fat/oil-calcium oxide admixture.

Fatty acid feedstocks are employed containing up to about 60 weight percent of the fatty acid content in the form of fatty acid glycerides. Glyceride levels between about 30 and about 60 weight percent are preferred.

Suitable feedstocks include essentially any glyceride or glyceride derivative having a fatty acid profile determined to be nutritionally or physiologically beneficial to a ruminant. Beneficial fatty acid profiles are readily identified by those of ordinary skill in the art, and may be derived from any known source, inclusive of fatty acid sources of animal, vegetable or fish origin. This includes distillates and soap stocks of lard or tallow, vegetable oils such as canola oil, sunflower oil, safflower oil, rapeseed oil, soy bean oil, olive oil, corn oil, palm oil, and the like, and byproducts thereof, as well as fish oils and byproducts thereof.

Such fatty acid feedstocks typically contain from about 10 to about 100 weight percent of the fatty acid content in the form of fatty acid glycerides, from about 0 to about 90% by weight of free fatty aids, and less than 5% by weight of moisture, insolubles and unsaponifiables. When necessary, the glyceride content may be reduced to about 60% by weight and lower by adding fatty acid distillates such as PFAD to the feedstock or by pre-treatment to convert a portion of the glycerides to free fatty acids, either catalytically through the use of enzymes, including lipases, or by hydrolysis. Pretreatment processes may also include processes that increase the level of desirable fatty acids, for example, cold acetone extraction may be used to increase the level of EPA and DHA in fish oil.

The present invention thus makes possible the preparation of fatty acid calcium salts from fish oils, which have a 100% glyceride content. According to one embodiment of the present invention, from about 15 to about 50 weight percent of fish oil is blended with from about 85 to about 50 weight percent of a fatty acid feedstock sufficiently low in glyceride content to provide a blend with a glyceride content of less than about 60% by weight. Blends of fish oils with PFAD within these weight ratios are included within the scope of the present invention. A blend containing from about 20 to about 35% by weight of fish oil is preferred.

The process of the present invention is particularly well suited for the preparation of fatty acid calcium salts containing beneficial levels of DHA and EPA from fatty acid feedstocks containing high levels of fish oil. Oils containing from about 7 to about 16% by weight DHA and from about 10 to about 17% by weight EPA are preferred.

The feedstock may also contain up to about 95% by weight of unsaturated C: 16-C:22 fatty acids. Unsaturated fatty acid levels between 50 and about 80 weight percent are preferred. In general, unsaturated fatty acids having from 16 to 22 carbon atoms and from 1 to 6 double bonds are suitable for use with the present invention. Polyunsaturated fatty acids are preferred, with examples of desirable polyunsaturated fatty acids including fish oil-derived omega-3 and omega-6 fatty acids. Suitable fish oil sources include menhaden, herring, mackerel, caplin, tilapia, tuna, sardine, pacific saury, krill, and the like.

It may be necessary to heat the fatty acid feedstock to form a uniform, liquid admixture, depending upon the degree of saturation. A temperature up to about 175° F. is suitable, with a temperature between about 120 and about 140° F. being preferred.

Calcium oxide is added to the fatty acid feedstock in the range from about 2 to about 3 equivalents relative to the fatty acid feedstock. A calcium oxide level between about 2.25 and 2.75 equivalents is preferred.

Water is then added to hydrate the calcium oxide to its hydroxide form, creating a large amount of exothermic heat. The heat that is evolved usually is sufficient for the fatty acid neutralization reaction to proceed to completion, so that it is not necessary to supply heat to the reaction mixture. Between about 2 and about 5 equivalents of water relative to the calcium oxide is added to the reaction mixture, with between about 2.5 and about 3.5 equivalents being preferred.

The excess water is converted to steam by the exothermic heat generated and boils off rapidly. The reaction can be performed under atmospheric pressure, or under vacuum to draw off the steam.

The amount of time required for the reaction is between about 5 and about 60 minutes, and more typically between about 6 and about 15 minutes. The reaction is easily identified by the transformation of the admixture into a solid granular mass. Upon transfer from the reaction vessel, it can easily be processed into dry free-flowing particles.

Fish oil derived fatty acid calcium salt rumen bypass feed supplements of the present invention have a residual glyceride content below about 5 weight percent and contain from about 1 to about 10% by weight EPA calcium salt and from about 1 to about 10% by weight DHA calcium salt. Products containing from about 1.5 to about 9% by weight of EPA and DHA are preferred. The EPA- and DHA-containing feed supplements derived from fish oil/PFAD blends enhance the fertility of female ruminants. The present invention makes possible the commercially viable preparation of DHA- and EPA-rich calcium salt feed supplements for the enhancement of female ruminant fertility.

The present invention therefore includes fatty acid calcium salts having a fatty acid profile consistent with a profile resulting from blending from about 15 to about 50% by weight of fish oil with from about 85 to about 50% by weight of PFAD, wherein the fatty acid profile includes from about 1 to about 10% by weight of DHA and from about 1 to about 10% by weight of EPA.

The fatty acid calcium salt rumen inert feed supplements of the present invention may be conveniently fed to a ruminant admixed with a conventional ruminant feed. The feeds are typically vegetable materials edible by ruminants, such as legume hay, grass hay, corn silage, grass silage, legume silage, corn grain, oats, barley, distiller's grain, brewer's grain, soya bean meal and cottonseed meal. There is no particular lower limit of the calcium salt to be added to the ruminant feed, although in practice, amounts of the calcium salt below an amount that supplies 6 grams per day each of DHA and EPA are too small to provide significant fertility enhancement.

The fertility of female ruminants is enhanced when they are fed the EPA- and DHA-containing calcium salts starting as early as 21 days before parturition. While useful enhancement of fertility may be obtained by starting dietary supplementation at parturition or as late as 28 days following parturition, optimal results are obtained by earlier supplementation.

The dietary supplementation should continue daily at least until conception. However, because the DHA- and EPA-containing calcium salts of the present invention also enhance fertility by reducing embryonic death in the months following conception, the present invention also includes methods in which dietary supplementation is continued for at least 30 days and preferably for at least 60 days after conception. Beneficial results are obtained when dietary supplementation is continued up to 150 days after conception.

The DHA- and EPA-containing calcium salts of the present invention may be co-administered with additional quantities of other fatty acid calcium salts that are fed to ruminants for other purposes. The DHA- and EPA-containing calcium salts may be co-administered with a fatty acid calcium salt intended to supply energy to a high milk production ruminant, with a calcium salt having a fatty acid profile selected to modify the fatty acid profile of the milk fat or meat fat of the ruminant, or with both. Accordingly, the methods of the present invention for enhancing female ruminant fertility do not exclude the co-administration of other fatty acid calcium salt that do not contain DHA or EPA. One method in accordance with the present invention transitions the ruminant from the DHA- and EPA-containing calcium salts of the present invention to fatty acid calcium salts intended to supply energy to a high milk production ruminant once the fertility-enhancing benefits of the DHA- and EPA-containing calcium salts are no longer needed.

The following non-limiting examples set forth herein below illustrate certain aspects of the invention. All parts and percentages are by weight unless otherwise noted, and all temperatures are in degrees Fahrenheit.

EXAMPLES

Example 1

190 kg of calcium oxide was added to a vertical mixer (with "Cowles-type" dispensing blades) containing a blend of 190 kg of menhaden fish oil (Omega Protein, Hammond, La.) and 740 kg PFAD. The fish oil had by concentration 15.7% by weight DHA and 11.7% by weight EPA. The total glyceride content was approximately 35 weight percent. Prior to adding the calcium oxide, the fish oil/PFAD blend was heated to a temperature of 130° F. After the calcium oxide was uniformly dispersed (approximately 2 minutes) 204 kg of water was added, producing an exothermic reaction that heated the temperature of the mixture to between 160 and 170° F. Agitation continued until a uniform, homogenous mixture was obtained, which was dumped from the vessel into a tray, after which the reaction went to completion in a 210 to 240° F. over-boil. The product was then permitted to cool. Milling of the finished product produced a free-flowing granule that was not dusty having an unreacted glyceride content of less than 4% by weight. The total fat content was about 82% by weight, including DHA and EPA.

Examples 2-6

Example 1 was repeated using the following quantities of water, calcium oxide, fish oil and PFAD:

|  | EXAMPLE | | | | |
| --- | --- | --- | --- | --- | --- |
|  | 2 | 3 | 4 | 5 | 6 |
| Water | 180 kg | 180 kg | 180 kg | 180 kg | 180 kg |
| CaO | 180 | 190 | 180 | 180 | 186 |
| Fish Oil | 190 | 190 | 190 | 190 | 186 |
| PFAD | 740 | 750 | 750 | 750 | 750 |

Free-flowing granules were obtained that were not dusty and had an unreacted glyceride content of less than 5% by weight. Fat content ranged between 81 and 84% by weight, which included DHA and EPA.

The following examples demonstrate enzyme pre-treatment processes to reduce a portion of the glyceride content of fish oils:

Example 7

Dry fungal-derived lipase was tested and found to have a lipase activity level of 150,000 FIP/gram concentration. A lipase mixture was prepared by blending 13.3% by weight of the dry lipase with a 10% by weight gum arabic emulsifier solution. Peruvian Crude Fish Oil was processed with the lipase mixture at a 10% weight ratio of lipase mixture to fish oil, corresponding to 1.33% by weight dry lipase being added to the fat mixture. The mixture was allowed to react for 18 hours at 104° F. At the end of the 18 hours, 67 grams of the lipase treated fish oil was blended with 140 grams PFAD and reacted with 40 grams of calcium oxide and 38 grams of water to convert the mixture to a calcium salt according to the procedure described in Example 1.

The product that resulted had less than 5% of the glyceride content remaining as unreacted fat. The resulting calcium salts where a dry free-flowing powder.

Example 8

Example 7 was repeated using a yeast-derived lipase having an activity of 200,000 FIP/gram in a quantity corresponding to 1% dry lipase being added to the fish oil.

The product that resulted contained less than 5% of the glyceride content remaining as unreacted fat. The resulting calcium salts where a dry free-flowing powder.

Example 9

Example 7 was repeated using a commercial liquid lipase in a propylene glycol diluent. It was added at 10% by weight of the fish oil for treatment under the same time/temperature conditions.

The product that resulted contained less than 5% of the glyceride content remaining as unreacted fat. The resulting calcium salts were a dry free-flowing powder.

The present invention thus provides rumen-protected fatty acid calcium salts rich in DHA and EPA for enhancement of ruminant fertility. The present invention also provides a method for the preparation of these products in a form familiar to and accepted by the dairy and cattle industry.

The foregoing examples and description of the preferred embodiment should be taken as illustrating, rather than as limiting, the present invention as defined by the claims. As will be readily appreciated, numerous combinations of the features set forth above can be utilized without departing from the present invention as set forth in the claims. Such variations are not regarded as a departure from the spirit and scope of the invention, and all such modifications are intended to be included within the scope of the following claims.

What is claimed is:
1. A method for reducing the likelihood of embryonic death in a female ruminant, comprising:
  (1) feeding said ruminant from before conception until 31 to 150 and for at least 30 days after conception an effective amount of an omega-3 fatty acid source consisting of a free-flowing fatty acid calcium salt product consisting of less than 5% by weight residual glyceride, from about 1 to about 10% by weight of eicosapentaenoic acid (EPA) calcium salt, from about 1 to about 10% by weight of decosahexaenoic acid (DHA) calcium salt and from about 80 to 98% by weight of other $C_{10}$-$C_{22}$ fatty acid calcium salts, wherein at least 6 g per day of said omega-3 fatty acid source is fed to said ruminant in a ration of fatty acid calcium salts fed to said ruminant to supply energy for milk production; and
  (2) thereafter, the feeding of said product comprising EPA and DHA is discontinued in favor of feeding daily to said female ruminant a fatty acid calcium salt product for supplying milk production energy to a female ruminant.

2. The method of claim 1, wherein said omega-3 fatty acid source has a fatty acid profile consistent with a profile resulting from blending from about 15 to about 50% by weight of one or more fish oils with from about 85 to 50% by weight of PFAD.

3. The method of claim 2, wherein said fish oils are derived from one or more fish oil sources selected from the group consisting of menhaden, herring, mackerel, caplin, tilapia, tuna, sardine, pacific saury and krill.

4. The method of claim 1, wherein said female ruminant is a dairy cow.

5. The method of claim 1, comprising starting the feeding of said product to said female ruminant between about 21 days before and about 28 days after parturition.

6. The method of claim 1, wherein said product is fed to said female ruminant daily.

7. The method of claim 1, wherein said product is fed to said female ruminant for at least 60 days after conception.

8. The method of claim 7, wherein said product is fed to said female ruminant for at least 150 days after conception.

* * * * *